United States Patent
Leistner

(10) Patent No.: US 6,637,994 B2
(45) Date of Patent: Oct. 28, 2003

(54) SQUARE-HEADED RIVET FASTENER

(75) Inventor: Volkmar Leistner, Scarborough (CA)

(73) Assignee: Falcon Fasteners Reg'D (CA)

( * ) Notice: Subject to any disclaimer, the term of this patent is extended or adjusted under 35 U.S.C. 154(b) by 0 days.

(21) Appl. No.: 10/105,248

(22) Filed: Mar. 26, 2002

(65) Prior Publication Data

US 2003/0185645 A1 Oct. 2, 2003

(51) Int. Cl.[7] ................ F16B 37/04; F16B 39/00
(52) U.S. Cl. ............... 411/181; 411/177; 411/183; 411/188
(58) Field of Search ................ 411/113, 173, 411/177, 179, 180, 181, 183, 188

(56) References Cited

U.S. PATENT DOCUMENTS

| | | | |
|---|---|---|---|
| 3,480,061 A | | 11/1969 | Leistner |
| 4,508,478 A | | 4/1985 | Leistner |
| 5,071,299 A | * | 12/1991 | Sekine et al. ............ 411/183 |
| 5,288,244 A | * | 2/1994 | Lien .................. 411/183 X |
| 5,348,432 A | | 9/1994 | Nagayama |
| 5,429,466 A | * | 7/1995 | Nagayama ............. 411/181 X |
| 5,863,164 A | * | 1/1999 | Leistner ................... 411/181 |
| 6,109,849 A | * | 8/2000 | Nagayama ............... 411/181 |

OTHER PUBLICATIONS

Blueprint dated May 21, 1969.

* cited by examiner

*Primary Examiner*—Neill Wilson
(74) *Attorney, Agent, or Firm*—H. Jay Spiegel

(57) ABSTRACT

A fastener includes a generally square flange having arcuate corners. Eight upstanding ribs are provided, equally spaced about the periphery of the flange. When the fastener is inserted in a piece of material, the ribs dig into the surface of the piece of material to prevent the fastener from rotating when a threaded fastener is advanced into the opening through the shaft from the opposite side. Extending upwardly from the top surface of the flange is an elongated shaft having two adjacent regions, one adjacent the flange having relatively thicker threaded walls and another distal from the flange having thinner unthreaded walls.

34 Claims, 3 Drawing Sheets

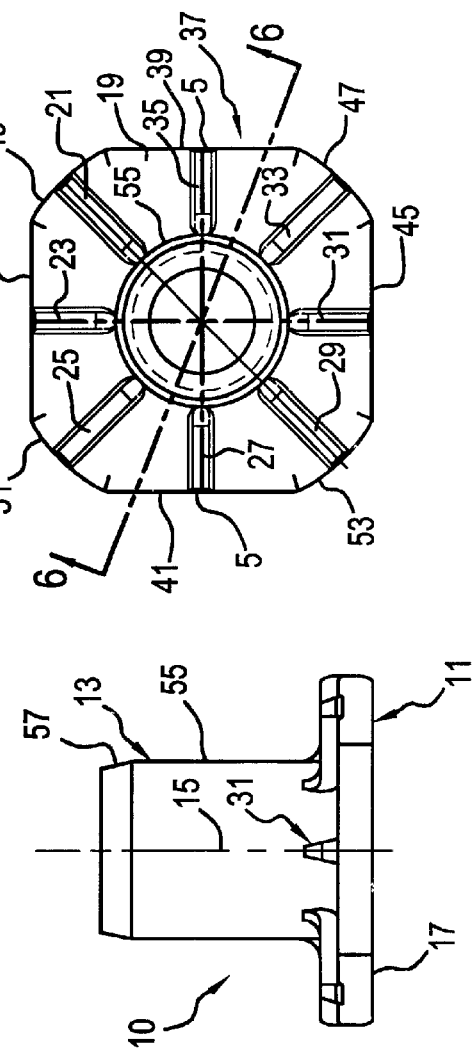

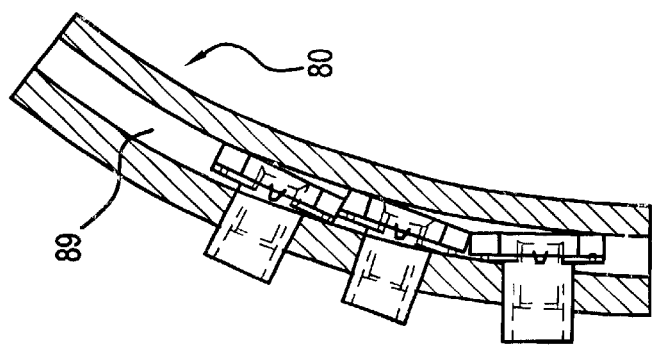
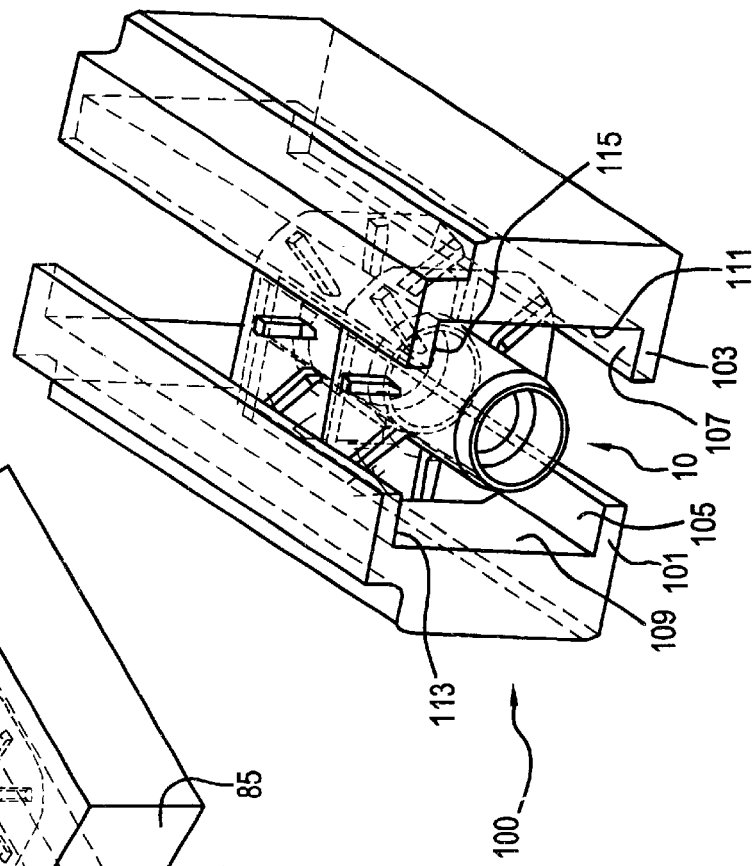
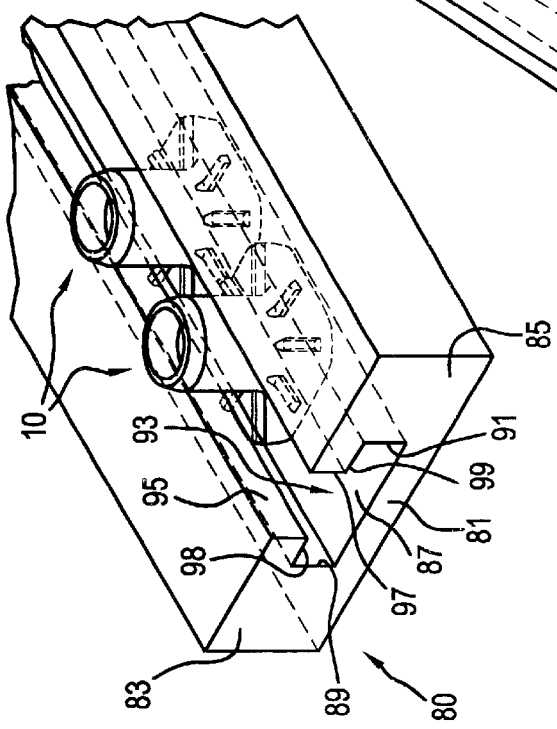

SQUARE-HEADED RIVET FASTENER

BACKGROUND OF THE INVENTION

The present invention relates to a square-headed rivet fastener. Fasteners including a flange with a shaft extending therefrom-are well known. It is also well known to provide the shaft with an end remote from the flange having a reduced wall thickness to facilitate riveting that end over the surface of a piece of material through which the shaft has been inserted to hold the fastener against axial movement once riveted.

Applicant is aware of U.S. Pat. No. 5,348,432 to Nagayama that teaches a rivet-type tee nut having an octagonal flange with a shaft extending therefrom having a thicker-walled threaded portion adjacent the shaft and a thinner-walled unthreaded portion remote therefrom. In the Nagayama patent, two pairs of pawls are provided and are interconnected together by respective linear edges of the flange.

The concept of a tee nut having an octagonal flange in which pairs of pawls are interconnected by a linear edge was first developed by Sigma Tool & Machine as disclosed in U.S. Pat. No. 3,480,061 to Walter Leistner. The tee nut disclosed and claimed in the '061 patent was designed to permit it to be guided both as a tee nut blank to the station where it would be tapped, and as a completed tee nut to a location where it would be inserted. The linear edge between the pair of pawls was devised to permit adjacent tee nuts in the track (or tee nut blanks) to abut one another to preclude shingling, that is, overlapping of the flanges of adjacent tee nuts. When shingling occurs, the track becomes jammed and production must be stopped to un-jam the track.

In 1983, Sigma Tool & Machine developed an improved tee nut and obtained U.S. Pat. No. 4,508,478 to Herbert E. Leistner in 1985. The '478 patent improved upon the '061 patent by providing an inverted U-shaped abutment between the respective pairs of pawls, thereby rendering the edge therebetween non-linear and increasing the height of the abutment engaging an adjacent tee nut to significantly enhance protection against shingling.

In the '061 patent and '478 patent, tee nuts are disclosed as guided within the track by engagement of sides of the upraised pawls within a slot formed in the track. Tee nuts such as disclosed in Nagayama's '432 patent are guided in the track in the same manner.

A need has developed for a rivet-type fastener that may be guided within the track by the sides of the tee nut rather than by the pawls and wherein ribs are used to prevent shingling. Furthermore, a need has developed for a fastener wherein the fastener blank is formed in a forging operation with the fastener blank being subsequently tapped. A need has also developed for a fastener which may be guided in a track with the axis of elongation of the shaft thereof parallel to the direction of movement along the track rather than perpendicular to the direction of movement as is the case with tee nuts as disclosed in the '061, '478 and '432 patents. It is with these needs in mind that the present invention was developed.

SUMMARY OF THE INVENTION

The present invention relates to a square-headed rivet fastener. The present invention includes the following inter-related objects, aspects and features:

(1) The present invention includes a generally square flange having arcuate corners. Eight upstanding ribs are provided, equally spaced about the periphery of the flange, each of which has a generally trapezoidal cross-section with sides tapering toward one another in the upward direction toward the shaft. When the inventive fastener is inserted in a piece of material such as, for example, a piece of wood, the ribs dig into a surface of the piece of wood to prevent the fastener from rotating when a threaded fastener is advanced into the opening through the shaft thereof from the opposite side.

(2) Each of the ribs is spaced from an adjacent rib by the combination of a linear edge and an arcuate edge of the flange. By "edge," Applicant means the intersection between a top surface of the flange and a side wall thereof. Through the manufacturing process, there is no indentation formed in the bottom surface of the flange in a location aligned with each rib.

(3) Extending upwardly from the top surface of the flange is an elongated shaft that may, if desired, be generally cylindrical in outer configuration. It may also take on non-cylindrical shapes such as square or triangular cross-sectional shapes and shapes in which the diameter of the shaft varies along its length. At the end of the shaft distal from the flange, it is preferred that a tapered end be provided to best facilitate insertion of that end of the shaft within an opening in a piece of material. While the shaft has been described as generally cylindrical, in reality, the shaft must assume a slight taper from the flange to the end of the shaft distal from the flange so that, during the course of manufacture, the shaft can easily be removed from the die that is used to manufacture it.

(4) The shaft has two adjacent regions including a first region adjacent the flange having relatively thicker walls and an opening therethrough tapped with female threads. A second region distal from the flange has thinner walls and is unthreaded. If desired, a transition region may be provided between the first and second regions which comprises a generally frusto-conical surface diverging outwardly in the direction toward the distal end of the shaft. Of course, if desired, the wall thickness of the shaft may be made uniform substantially throughout its length.

(5) Where the passageway through the inventive fastener intersects with the bottom surface of the flange, the passageway may taper in a direction from the bottom surface of the flange toward the distal end of the shaft. This taper allows easy guidance of adjacent fasteners in a track in an embodiment where the track is configured to guide the fasteners with the axes of elongation of the shafts thereof aligned with the direction of movement through the track.

As such, it is a first object of the present invention to provide a square-headed rivet fastener.

It is a further object of the present invention to provide such a fastener in which upstanding trapezoidal cross-section ribs are employed to prevent shingling.

It is a still further object of the present invention to provide such a fastener including a generally cylindrical shaft with a tapered end to facilitate insertion of the fastener into an opening formed in a piece of material.

It is a still further object of the present invention to provide such a fastener in which the ribs embed themselves within a surface of a piece of material when the fastener is inserted to preclude rotation of the fastener while a threaded fastener is threaded into the threaded opening in the shaft thereof.

These and other objects, aspects and features of the present invention will be better understood from the following detailed description of the preferred embodiment when read in conjunction with the appended drawing figures.

BRIEF DESCRIPTION OF THE DRAWINGS

FIG. 1 shows a side view of the preferred embodiment of the present invention.

FIG. 2 shows a top view thereof.

FIG. 3 shows a perspective view of the present invention.

FIG. 4 shows a bottom view of the present invention.

FIG. 5 shows a cross-sectional view along the line 5—5 of FIG. 2.

FIG. 6 shows a cross-sectional view along the line 6—6 of FIG. 2.

FIG. 7 shows a perspective view of fasteners guided in a guide track with the direction of motion of the fasteners perpendicular to the axes of elongation of the shafts thereof.

FIG. 8 shows a cross-section of the track showing the guidance of the fasteners within the track from the side.

FIG. 9 shows a perspective view of an alternative track which guides the fasteners in a direction aligned with the axes of elongation of the shafts thereof.

SPECIFIC DESCRIPTION OF THE PREFERRED EMBODIMENT

Figure 10:
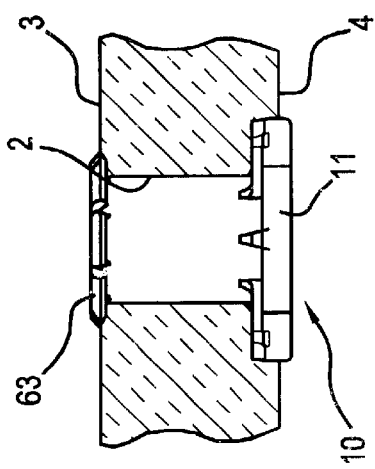
FIG. 10 shows a perspective view of a piece of material in which a fastener in accordance with the teachings of the present invention has been inserted through an opening thereof and then riveted.

With reference to FIGS. 1–6, the inventive fastener is generally designated by the reference numeral 10 and is seen to include a flange 11 and a shaft 13 extending therefrom. The shaft 13 has an axis of elongation 15 (FIG. 1) that is perpendicular to the bottom surface 17 of the flange 11.

The flange 11 also has a top surface 19 (FIG. 2) which has, extending upwardly therefrom, a plurality of ribs identified by the reference numerals 21, 23, 25, 27, 29, 31, 33 and 35. As best seen in FIG. 1, with reference to the rib 31, the ribs are generally trapezoidal in cross-section with the thicker portion of the trapezoid intersecting with the surface 19 of the flange 11.

As best seen in FIGS. 2 and 4, the flange 19 has a periphery 37 consisting of one pair of flat side walls 39 and 41 opposed from one another about the periphery of the flange 11, a second pair of opposed flat side walls 43 and 45, and arcuate side walls 47, 49, 51 and 53. Each of the eight side walls of the flange 19 has, associated therewith, one of the upstanding ribs. This is best seen in FIG. 2. As also seen in FIG. 2, any two adjacent ribs are separated from one another about the periphery of the flange by a portion of one of the flat sides thereof and a portion of one of the arcuate sides thereof. Thus, as best seen in FIG. 2, opposed flat sides of the flange 19 are each bisected by an upstanding rib and each arcuate side of the flange is bisected by an upstanding rib. In the preferred embodiment, each of the eight side walls is generally perpendicular to the top surface 19 of the flange 11.

With reference to FIGS. 1, 2, 5 and 6, the shaft 13 has an outer wall including a generally cylindrical portion 55 and an end 57 distal from the flange 11 that is tapered in the distal direction. While the reference numeral 55 has been used to describe what is called a "cylindrical shape, in reality, a slight taper is provided in the direction from the flange 11 in the distal direction therefrom to facilitate removal of the fastener 10 from the die during the course of manufacture. Of course, as explained above, the shaft can have a non-cylindrical outer shape.

With reference to FIGS. 2 and 5, the shaft 13 includes an internal passageway aligned with the axis 15 including a passageway portion 59 having a smaller diameter than the passageway portion 61. The passageway portion 61 has a wall 63 that is thinner than the wall 65. The passageway portion 59 includes female threads 67 extending from the reference numeral 69 to the reference numeral 71 in FIG. 5. A frusto-conical surface 73 is provided as a transition from the bottom surface 17 of the flange to the threaded portion 67. A further frusto-conical transition surface 75, seen in FIGS. 2 and 5, provides a transition from the threaded portion 67 to the unthreaded passageway portion 61.

With reference now to FIGS. 7 and 8, a track is generally designated by the reference numeral 80 and is seen to include a bottom wall 81 and side walls 83 and 85. The track 80 defines an inner chamber including a bottom surface 87, side surfaces 89 and 91, and a slot 93 which is defined by inner facing walls 95 and 97. Between the wall 95 and the wall 89, a horizontal wall 98 is 7 provided. Similarly, between the walls 97 and 91, a horizontal wall 99 is provided. The walls 89 and 91 are vertically disposed and are of equal length, the length being greater than the height of the flange 11. This discrepancy is provided because, as best seen in FIG. 8, often the track must be curved. Were the height of the walls 89 and 91 to closely approximate the height of the flange 11, including the upward extents of the ribs, at curved portions such as shown in FIG. 8, the fasteners could easily jam within the track. FIG. 8 also illustrates the side walls of adjacent fastener flanges riding up on the side walls of abutting flanges. As should be understood, particularly from FIG. 8, the ribs prevent any overlap of the flanges that would be best described as shingling and would cause jamming of the track 80.

As best seen in FIGS. 7 and 8, when fasteners 10 are being conveyed in the track 80, abutting side walls of the respective flanges of the adjacent fasteners 10 engage one another with adjacent ribs, for example, 27 on one fastener and 35 on an adjacent fastener, engage one another to prevent shingling. Since the flange 11 is generally square, it may be inserted into the track 80 at any one of four rotative positions about the axis 15.

As should be understood from comparison of FIG. 7 and FIG. 5, the direction of travel of the fasteners 10 in the track 80 is perpendicular to the axes of elongation 15 of the shafts thereof. By contrast, in the configuration shown in FIG. 9, the track 100 is designed to convey fasteners 10 in a direction aligned with the axes of elongation 15 of the shafts thereof.

With reference to FIG. 9, the track 100 is seen to include bottom walls 101 and 103 having horizontal surfaces 105 and 107 lying in a common plane. Vertical side surfaces 109 and 111 lie in parallel planes and upper horizontal surfaces 113 and 115 lie in a common horizontal plane that is parallel to the horizontal plane in which the surfaces 105 and 107 lie. The distance between the surfaces 113, 115 on the one hand, and 105, 107 on the other hand, is designed to be equal to the respective distances between the side walls 43, 45 or 39, 41 of the flange 11 of the fastener 10. In this way, as seen in FIG. 9, fasteners 10 can be guided within the track 100 with their axes of elongation 15 (FIG. 5) aligned with the direction of movement in the track 100. In order to prevent the fastener 10 from tipping over within the track 100 in the orientation shown in FIG. 9, as best understood from FIGS. 5 and 6, the tapered end 57 of the shaft 13 of one fastener enters the tapered surface 73 intersecting with the bottom surface 17 of the flange 11 of the next fastener to lock adjacent fasteners 10 in the position shown in FIG. 9.

In the preferred embodiment of the present invention, the inventive fastener 10 is manufactured in a forging process with all aspects of the fastener 10 save for the female threads being formed during the course of the forging process. After an unthreaded fastener blank has been so formed, it is conveyed to a tapping machine where it is tapped as shown in FIGS. 1–6. The track shown in FIGS. 7 and 8 may be employed to convey fastener blanks from a vibratory feeder bowl to a tapper where the fastener blanks are tapped. The same track configuration may be used to convey fastener blanks from a vibratory feeder bowl to a location where the fasteners are inserted through openings in pieces of material and subsequently riveted into fixed position.

Figure 11:
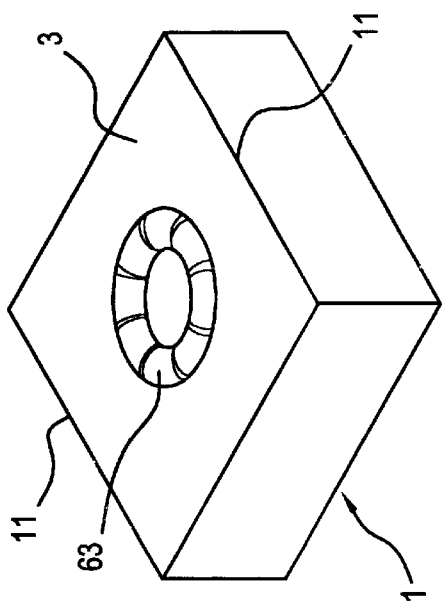
FIG. 11 shows a cross-sectional view of the material along the line 11—11 of FIG. 10 showing the fastener from the side.

Reference is now made to FIGS. 10 and 11 which depict one manner of use of the inventive fastener 10. A piece of material 1 has a passageway 2 therethrough. The fastener 10 has been inserted through the passageway 2 with the ribs of the flange 11 embedded into the bottom surface 4 of the piece of material 1 to prevent the fastener 10 from rotating. The end 63 of the shaft 13 has been riveted or flared to overlie the surface 3 of the piece of material 1.

Figure 12:
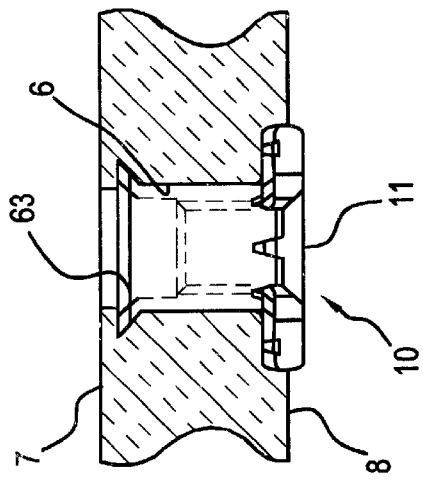
FIG. 12 shows a perspective view of a piece of material in which the fastener is riveted below the surface.
Figure 13:
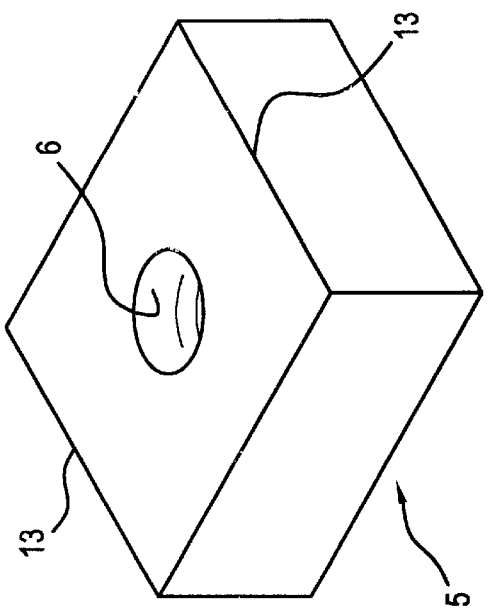
FIG. 13 shows a cross-sectional view along the line 13—13 of FIG. 12 showing the fastener from the side.

With reference to FIGS. 12 and 13, a piece of material 5 has a passageway 6 therethrough. The piece of material 5 has a top surface 7 and a bottom surface 8. The ribs of the flange 11 are embedded into the surface 8 to preclude the fastener 10 from rotating. The fastener is inserted into the passageway 6 and the end 63 of the shaft 13 is widened or flared within the passageway 6 to lock the fastener 10 in place so that it cannot be backed out of the passageway 6.

As such, an invention has been disclosed in terms of a preferred embodiment thereof which fulfills each and every one of the objects of the invention as set forth hereinabove, and provides a new and useful square-headed rivet fastener of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. A fastener comprising:
   a) a flange having a generally square periphery including four straight sides with opposed sides being parallel and adjacent sides perpendicular;
   b) said flange including an upstanding rib intersecting each straight side;
   c) a hollow shaft extending upwardly from said flange, said flange having an opening aligned with said shaft;
   d) said shaft having a first end adjacent said flange and a second end remote therefrom;
   e) said first end of said shaft having female threads and said second end of said shaft being unthreaded.

2. The fastener of claim 1, wherein between each pair of adjacent straight sides, an arcuate side is provided.

3. The fastener of claim 2, further including an upstanding rib intersecting each arcuate side.

4. The fastener of claim 1, wherein each rib bisects a side with which it intersects.

5. The fastener of claim 3, wherein each rib bisects a side with which it intersects.

6. The fastener of claim 1, wherein each side comprises a flat surface perpendicular to a top surface of said flange.

7. The fastener of claim 2, wherein each side comprises a surface perpendicular to a top surface of said flange.

8. The fastener of claim 1, wherein said shaft has an outer cylindrical surface.

9. The fastener of claim 1, wherein said first end of said shaft has an outer cylindrical surface, and said second end of said shaft continues said outer cylindrical surface toward a termination thereof.

10. The fastener of claim 9, wherein said termination includes a tapered surface.

11. The fastener of claim 1, wherein said shaft has an axis of elongation perpendicular to said flange.

12. The fastener of claim 1, wherein said second end of said shaft has a thinner wall thickness than a wall thickness of said first end.

13. The fastener of claim 12, wherein said second end has a cylindrical passageway therethrough having a diameter larger than a diameter of said female threads.

14. The fastener of claim 1, wherein said opening in said flange is tapered in a direction toward said second end of said shaft.

15. The fastener of claim 1, wherein each rib intersects a respective side perpendicularly.

16. The fastener of claim 15, wherein each rib bisects a respective side.

17. A fastener comprising:
   a) a flange having a generally square periphery including four straight sides with opposed straight sides being parallel and adjacent straight sides perpendicular, and wherein between each pair of adjacent straight sides, an arcuate side is provided;
   b) said flange including an upstanding rib intersecting and bisecting each side;
   c) a hollow cylindrical shaft extending upwardly from said flange, wherein said shaft has an axis of elongation perpendicular to said flange, said flange having a tapered opening aligned with said shaft;
   d) said shaft having a first end adjacent said flange and a second end remote therefrom;
   e) said first end of said shaft having female threads and a relatively thicker wall and said second end of said shaft being unthreaded and having a relatively thinner wall.

18. The fastener of claim 17, wherein said ribs intersecting each straight side intersect perpendicularly with respect thereto.

19. The fastener of claim 17, wherein each side comprises a surface perpendicular to a top surface of said flange.

20. The fastener of claim 17, wherein said shaft has a tapered termination surface.

21. The fastener of claim 17, wherein said second end has a cylindrical passageway therethrough having a diameter larger than a diameter of said female threads.

22. A fastener comprising:
   a) a flange having a generally square periphery including four straight sides with opposed sides being parallel and adjacent sides perpendicular;
   b) said flange including a flat top surface except for the presence of at least one upstanding rib;
   c) a hollow shaft extending upwardly from said flange;
   d) said shaft having a first end adjacent said flange and a second end remote therefrom;
   e) at least a portion of said shaft having female threads.

23. The fastener of claim 22, wherein between each pair of adjacent straight sides, an arcuate side is provided.

24. The fastener of claim 23, further including an upstanding rib adjacent at least one arcuate side.

25. The fastener of claim 22, wherein said at least one rib intersects a side of said flange.

26. The fastener of claim 22, wherein said at least one rib comprises a rib intersecting each side.

27. The fastener of claim 26, wherein each rib bisects a side with which it intersects.

28. The fastener of claim 22, wherein each side comprises a flat surface perpendicular to said top surface of said flange.

29. The fastener of claim 22, wherein said shaft has an outer cylindrical surface.

30. The fastener of claim 29, wherein said first end of said shaft has female threads and said second end of said shaft is unthreaded.

31. The fastener of claim 22, wherein said shaft has an axis of elongation perpendicular to said flange.

32. The fastener of claim 30, wherein said second end of said shaft has a thinner wall thickness than a wall thickness of said first end.

33. The fastener of claim 32, wherein said second end has a cylindrical passageway therethrough having a diameter larger than a diameter of said female threads.

34. The fastener of claim 26, wherein each rib intersects a respective side perpendicularly.

* * * * *